United States Patent [19]

Chen et al.

[11] Patent Number: 5,615,580
[45] Date of Patent: Apr. 1, 1997

[54] BICYCLE GEAR SELECTOR MECHANISM

[76] Inventors: Fu H. Chen, No. 23, 21th Rd., Taichung Industrial Park, Taichung City; Jenny C. H. Wang, No. 90, Kuang Fu Rd., Sec 2, San Chung City, Taipei Hsien, both of Taiwan

[21] Appl. No.: 575,824

[22] Filed: Dec. 20, 1995

[51] Int. Cl.[6] ............................. G05G 5/06; B62K 23/04
[52] U.S. Cl. ........................ 74/475; 74/489; 74/502.2; 74/506
[58] Field of Search ...................... 74/475, 489, 502.2, 74/506, 527

[56] References Cited

U.S. PATENT DOCUMENTS

| | | | |
|---|---|---|---|
| 5,241,877 | 9/1993 | Chen | 74/489 |
| 5,315,891 | 5/1994 | Tagawa | 74/489 |
| 5,524,501 | 6/1996 | Patterson et al. | 74/475 |

Primary Examiner—Charles A. Marmor
Assistant Examiner—Troy Grabow
Attorney, Agent, or Firm—Morton J. Rosenberg; David I. Klein

[57] ABSTRACT

A gear selector mechanism includes a positioning disk fixedly mounted around one distal end of the handlebar of a bicycle. A plurality of teeth are each formed on a periphery of positioning disk and each has a guiding face and a stop face. An actuating member is rotatably mounted around the one distal end of the handlebar and includes an actuating disk rotatably mounted to the positioning disk. An actuating block is formed on the actuating disk to rotate therewith and has an arcuate pushing perimeter slidably rested on a fixing stub of the derailleur cable of the bicycle. A retaining block is formed on the actuating disk. A catch member includes a flexible arcuate body slidably in the positioning disk and having a lug securely retained in a space of the retaining block and having a click detachably engaged with each of the plurality of teeth.

6 Claims, 5 Drawing Sheets

BICYCLE GEAR SELECTOR MECHANISM

FIELD OF THE INVENTION

The present invention relates to a gear selector mechanism, an more particularly to a gear selector mechanism for a bicycle and the like.

BACKGROUND OF THE INVENTION

The closest prior art of a gear selector was disclosed in Chen's U.S. Pat. No. 5,241,877, filed on Dec. 4, 1992, entitled by "GEAR SELECTOR". Another prior art of the gear selector was disclosed in Tagawa's U.S. Pat. No. 5,315,891, filed on Feb. 10, 1992 (PCT file date), entitled by "BICYCLE SPEED CHANGE OPERATION ASSEMBLY".

The present invention has been developed to eliminate disadvantages of the conventional gear selector.

SUMMARY OF THE INVENTION

In accordance with one aspect of the present invention, there is provided a gear selector mechanism for a bicycle which comprises a handlebar and at least one derailleur cable having a fixing stub formed on one distal end thereof.

The gear selector mechanism comprises a positioning disk fixedly mounted around one distal end of the handlebar and including a first side wall having a depression defined therein and a second side wall, a platform formed on the first side wall located in the depression and having an arcuate recess defined therein, a plurality of teeth each formed on a periphery of the first side wall and extending radially and inwardly therefrom and each having a guiding face and a stop face located opposite to each other, a notch defined between each two of the plurality of teeth, an elongate groove defined in the platform for receiving the fixing stub together with the one distal end of the derailleur cable therein.

An actuating member is rotatably mounted around the one distal end of the handlebar and includes an actuating disk rotatably mounted to the first side wall of the positioning disk, an actuating block formed on the actuating disk to rotate therewith and received in the depression and having an arcuate pushing perimeter slidably rested on the fixing stub of the derailleur cable, a substantially C-shaped retaining block formed on the actuating disk and received in the recess and including an open end portion facing the plurality of teeth and a closed end portion, and a space defined in the retaining block and communicating with the open end portion.

A catch member is fixedly attached to the retaining block to move therewith and including a flexible arcuate body slidably received in the recess, a lug formed on a first distal end of the arcuate body and securely retained in the space of the retaining block, and a click formed on a second distal end of the arcuate body and detachably engaged with each of the plurality of teeth. The click is guided to pass through the guiding face of each of the plurality of teeth and a returning movement of the click is stopped by the stop face of the associated teeth.

The foregoing as well as other objects and advantages of the present invention will become apparent from the following detailed description of preferred embodiments when considered in conjunction with the accompanying drawings, wherein:

DETAILED DESCRIPTION OF THE PREFERRED EMBODIMENTS

Figure 1:
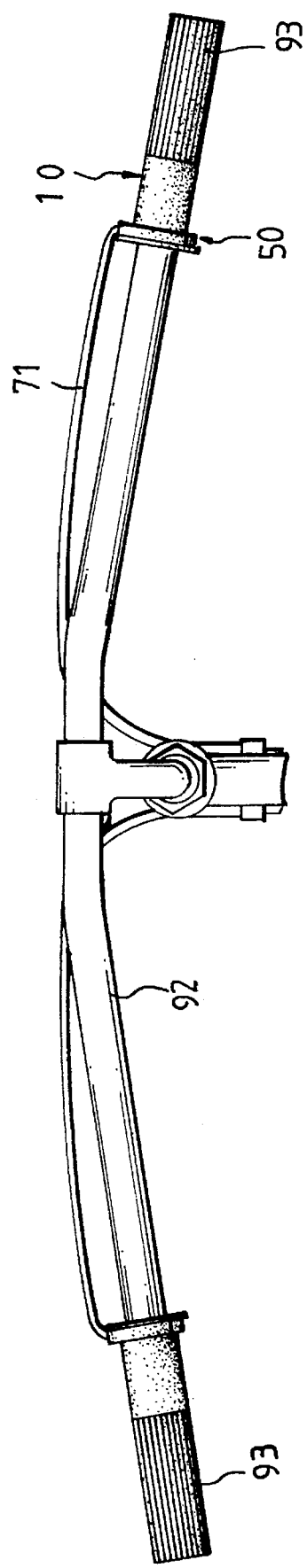
FIG. 1 is a partially top plan view of a bicycle.

Referring to the drawings, and initially to FIGS. 1–4, a gear selector mechanism in accordance with the present invention is adapted to be provided for a bicycle which comprises a handlebar 92, two handgrips 93, and at least, one derailleur cable 71 having a fixing stub 72 formed on one distal end thereof.

The gear selector mechanism comprises a positioning disk 50 fixedly mounted around one distal end of the handlebar 92 and including a first side wall 52 having a depression 53 defined therein and a second side wall. Preferably, a hole 51 is transversely defined through a central portion of the positioning disk 50 for the distal end of the handlebar 92 extending therethrough. A platform 54 is formed on the first side wall 52 located in the depression 53 and has an arcuate recess 55 defined therein.

The first side wall 52 has an inner periphery defining the arcuate recess 55 and a plurality of teeth 60 each formed on the inner periphery of the first, side wall 52 and extending radially and inwardly therefrom. Each one of the teeth 60 has a guiding face 61 and a stop face 62 located opposite to each other. A notch 63 is defined between each two of the plurality of teeth 60. It is to be noted that, the stop face 62 of each of the plurality of teeth 60 has a slope greater than that of the associated guiding face 61.

An elongate groove 70 is defined in the platform 54 for receiving the fixing stub 72 together with the one distal end of the derailleur cable 71 therein.

An actuating member 10 is rotatably mounted around the one distal end of the handlebar 92 located adjacent to the hand, grip 93 and includes an actuating disk 12 rotatably secured to the first side wall 52 of the positioning disk 50. Preferably, a hole 11 is transversely defined through a central portion of the actuating member 10 for receiving the distal end of the handlebar 92 therein.

An actuating block 40 is formed on the actuating disk 12 to rotate therewith and is received in the depression 53 and includes an arcuate pushing perimeter 41 slidably rested on the fixing stub 72 of the derailleur cable 71. Preferably, the arcuate pushing perimeter 41 includes a first end portion 410 located distal to a central portion of the actuating disk 12 and a second end portion 411 located proximate to the central portion of the actuating disk 12. In addition, a cavity 42 is defined in the second end portion 411 of the actuating block 40.

An indicating post 13 is formed on a periphery of the actuating disk 12 and is located outward of the positioning disk 50. Correspondingly, an indicating recess 520 is defined along an outer periphery of the positioning disk 50 for receiving the indicating post 13.

A substantially C-shaped retaining block 20 is formed on the actuating disk 12 and is received in the recess 55 and includes an open end portion 210 facing the plurality of teeth 60 and a closed end portion 211. A space 21 is defined in the retaining block 20 and communicates with the open end portion 210.

A catch member 30 is fixedly attached to the retaining block 20 to move therewith and includes a flexible arcuate body 32 slidably received in the recess 55. A lug 31 is formed on a first distal end of the arcuate body 32 and is securely retained in the space 21 of the retaining block 20. A click 33 is formed on a second distal end of the arcuate body 30 and is detachably engaged with each of the plurality of teeth 60. The click 33 is in alignment with the indicating post 13. The click 33 can be guided to pass through the guiding face 61 of each of the plurality of teeth 60 by means of the flexibility of the body 32 of the catch member 30 and a returning movement of the click 33 is stopped by the stop face 62 of the associated teeth 60.

The positioning disk 50 includes a first ear 56 formed on a periphery thereof. A receiving slot 701 is defined in the first ear 56 and is in alignment with the groove 70 for receiving the one distal end of the derailleur cable 71. The receiving slot 701 communicates with the groove 70 and has a width less smaller than that of the groove 70. A fastener member 57 is mounted for fastening the actuating disk 12 to the positioning disk 50 and includes a second ear 570 fixedly attached to the first ear 56 and an arcuate pawl 572 rested on the actuating disk 12, thereby fastening the actuating disk 12 between the positioning disk 50 and the fastener member 57. Preferably, a positioning bolt 561 extends through a hole 571 defined in second ear 570 and a hole 560 defined in the first ear 56 and is threadedly engaged with a nut 562.

The positioning disk 50 includes a flange 58 formed on the second side wall thereof and having a chamber 580 defined therein. A socket 581 is defined through a radially outer portion of the flange 58 and communicates with the chamber 580. A positioning member 80 is received in the chamber 580 and includes an arcuate pawl 801 rested against one distal end of the handlebar 92. The positioning member 80 has a head portion 803 and an opening 802 is defined in the head portion 803 and aligns with the socket, 581. An adjusting block 81 is rested on the head portion 803 of the positioning member 80 and is received in the chamber 580. An adjusting hole 810 is threadedly defined in the adjusting block 81 and aligns with the socket 581 and the opening 802. An urging bolt 82 extends through the socket 581, the adjusting hole 810 and the opening 802 and is urged on the head portion 803 of the positioning member 80, thereby securing the positioning disk 50 on the one distal end of the handlebar 92.

Figure 2:
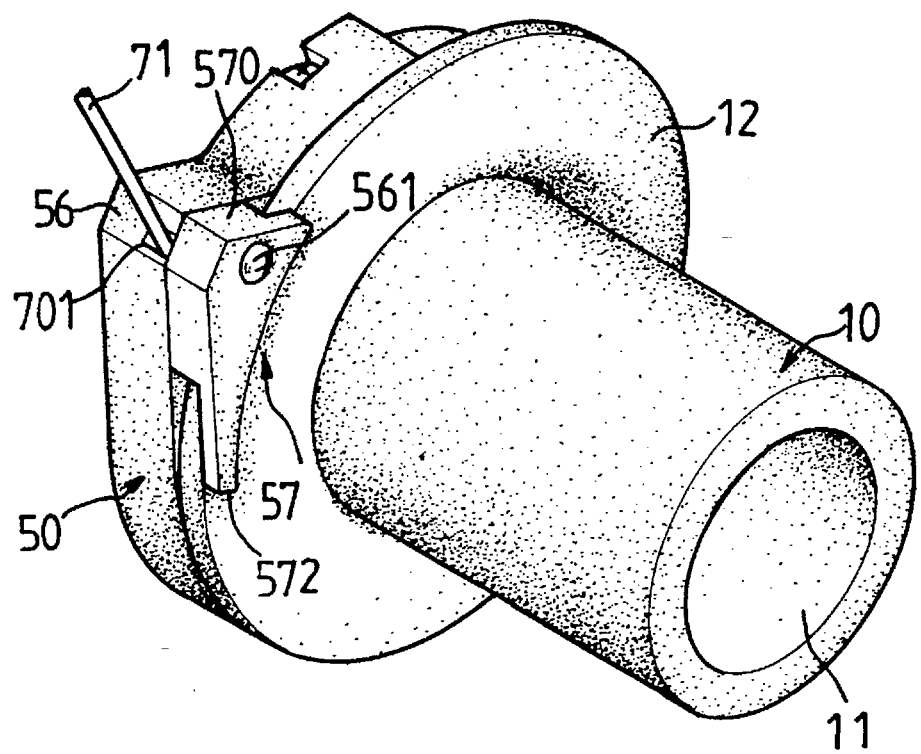
FIG. 2 is a perspective view of a gear selector mechanism according to the present invention.
Figure 3:
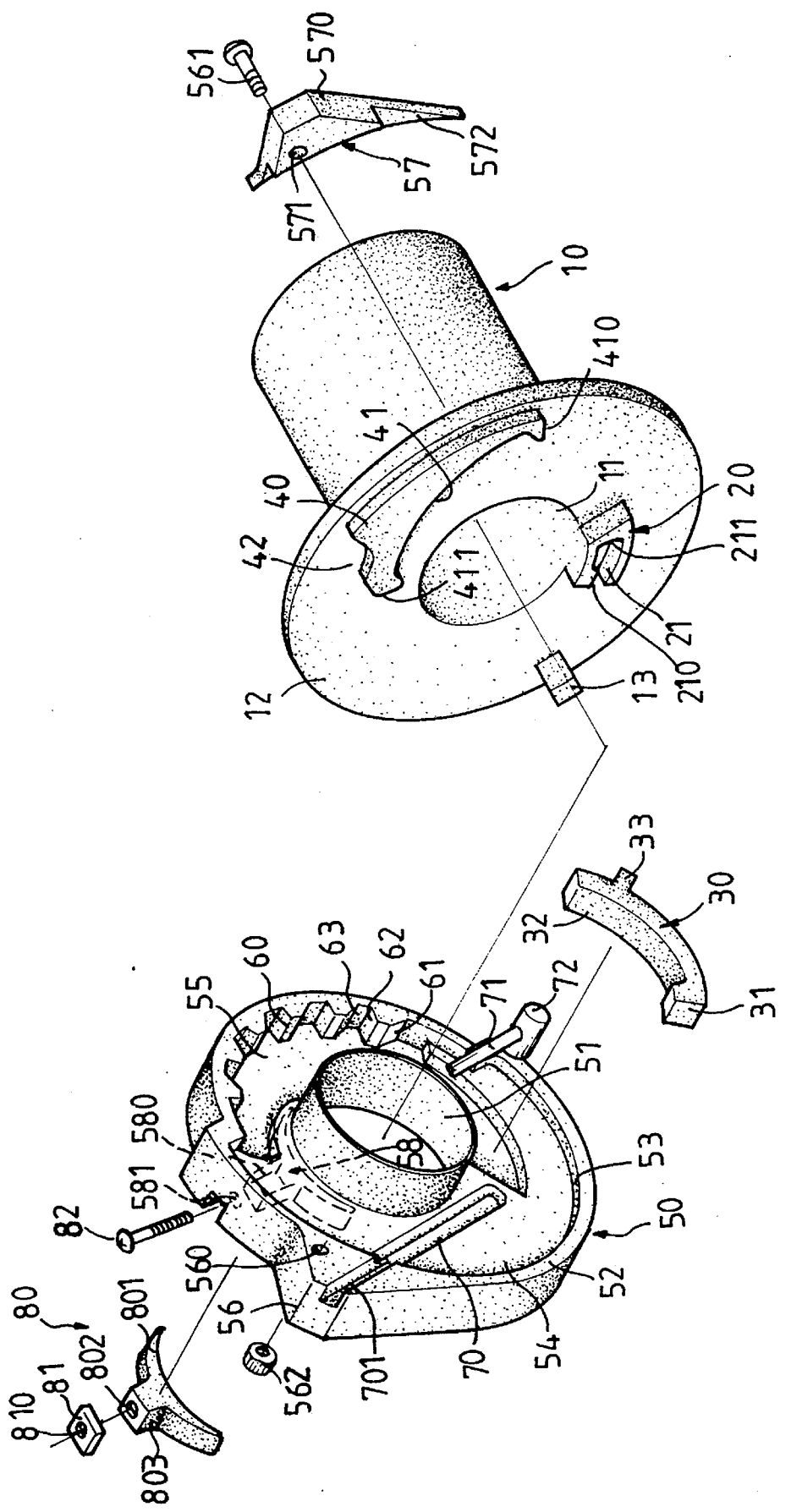
FIG. 3 is exploded view of FIG. 2.
Figure 4:
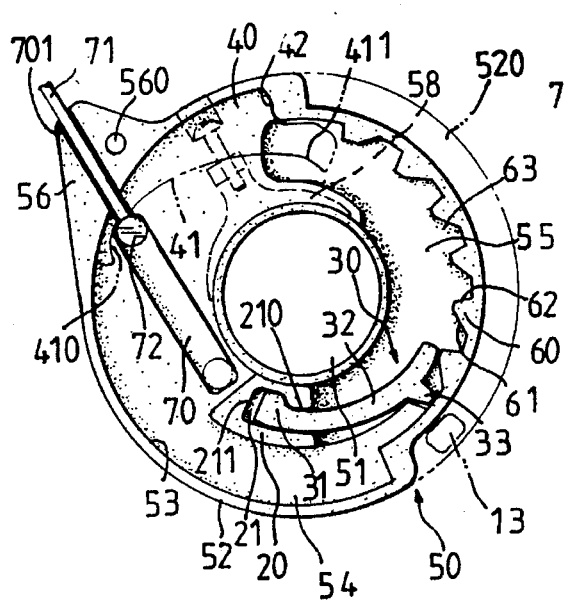
FIGS. 4–7 are side operational view of the gear selector mechanism.

In operation, referring to FIGS. 4–7 with respect to FIGS. 1–3, the derailleur cable 71 has a first distal end together with the fixing stub 72 slidably received in the groove 70, the slot 701 with the fixing stub 72 being urged by the pushing perimeter 41 of the actuating block 40, and has a second distal end connected to a derailleur (not shown) which can operate a drive chain (not shown) to move from one chain wheel (not shown) to another chain wheel (not shown) by means of assistance of the derailleur cable 71.

Figure 5:
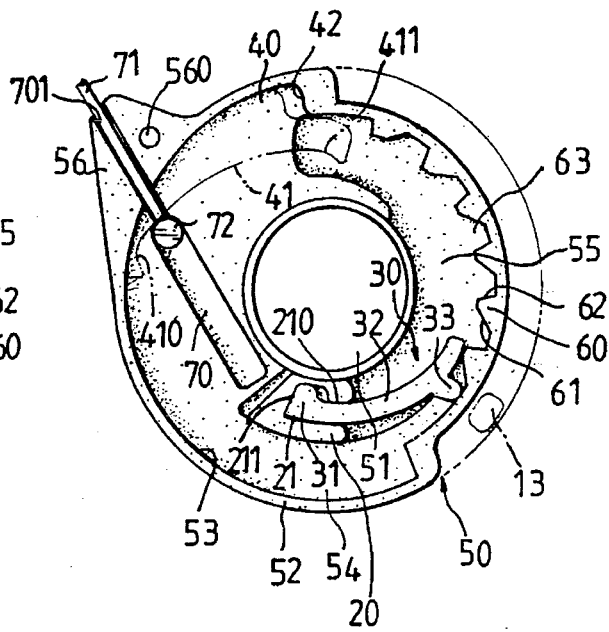
Figure 6:
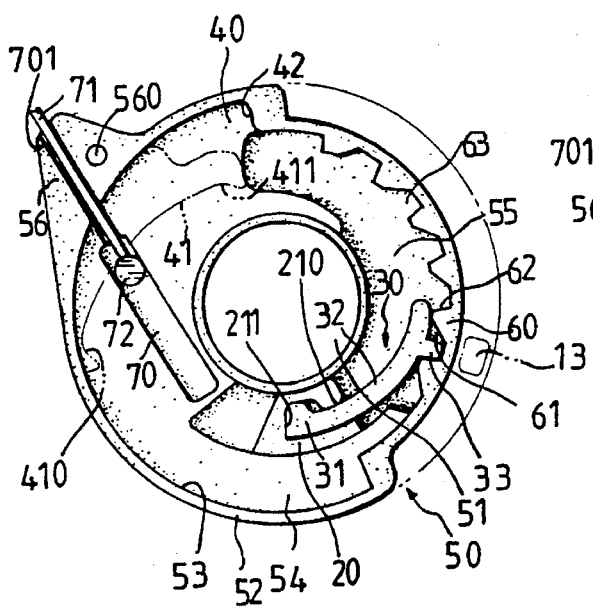

The actuating disk 12 can be operated to rotate with the actuating member 10, thereby pushing the lug 31 of the catch member 30 to move forward by means of the closed end portion 211 of the retaining block 20 from a state as shown in FIG. 5 to a situation as shown in FIG. 6. The click 33 of the catch member 30 can be urged to pass through the guiding face 61 of a first tooth 60 by means of the resilience of the flexible body 32 and is received in a first notch 63 as shown in FIG. 6. The returning movement of the click 33 is limited by means of the stop face 62 of the first tooth 60.

Figure 8:
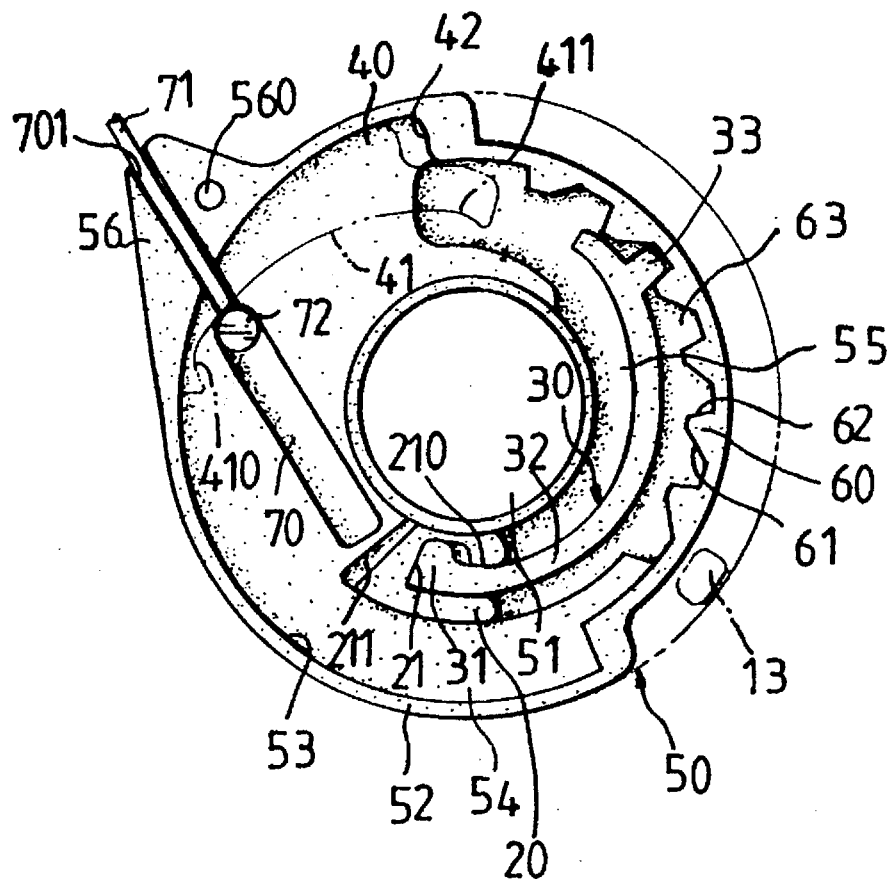
FIG. 8 is a side view according to another embodiment of the present invention.

At the same time, the pushing perimeter 41 of the actuating block 40 can be rotated to move from a location as shown in FIG. 8 to a position as shown in FIG. 6, thereby drawing the first distal end of the derailleur cable 71 together with the fixing stub 72 to move downwardly such that the derailleur can move the drive chain from the first chain wheel to the second chain wheel by means of drawing action of the derailleur cable 71, thereby achieving the effect of changing speeds.

Figure 7:
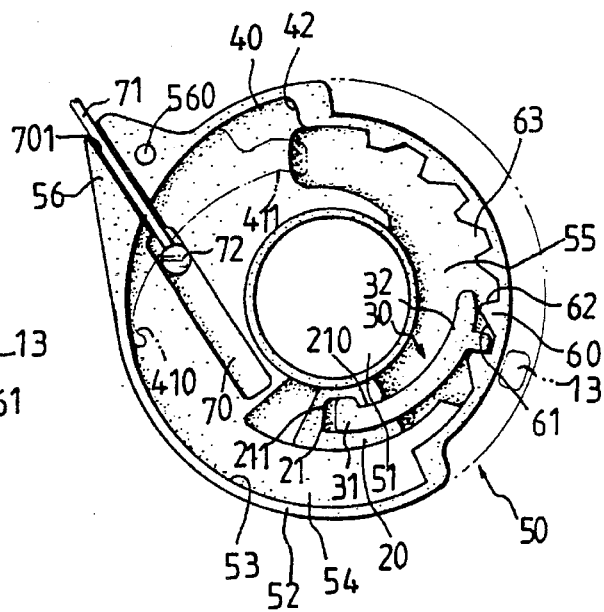

The derailleur can impose a recoil force against the pushing perimeter 41 of the actuating block 40 by means of the derailleur cable 71 such that the retaining block 20 can be moved backward slightly while a gap is formed in the space 21 between the closed end portion 211 and the lug 31 as shown in FIG. 7.

A user can rotate the actuating member 10 along a reverse direction, thereby moving the click 33 of the catch member 30 to be detached from the stop face 52 of the tooth 60 by means of the resilience of the flexible body 32. There are provided with a plurality of marks on the periphery of the positioning disk 50 corresponding to the indicating recess 520 such that the user knows the operation of the derailleur by the indicating post 13 pointing to a certain mark.

Referring to FIG. 8, the arcuate flexible body 32 of the catch member 30 can be adapted to have a long length.

While particular embodiments of the present invention have been described in detail herein, it should be understood that various changes and modifications may be made to the invention without departing from the scope of the present invention as defined by the appended claims.

What is claimed is:

1. A gear selector mechanism for a bicycle which comprises a handlebar and at least one derailleur cable having a fixing stub formed on one distal end thereof, said gear selector mechanism comprising:

a positioning disk fixedly mounted around one distal end of said handlebar and including a first side wall having a depression defined therein and a second side wall, a platform formed on said first side wall located in said depression and having an arcuate recess defined therein, said first side wall having an inner periphery defining said arcuate recess and a plurality of teeth each formed on said inner periphery of the first side wall and extending radially and inwardly therefrom and each having a guiding face and a stop face located opposite to each other, a notch defined between each two of said plurality of teeth, an elongate groove defined in said platform for receiving said fixing stub together with the one distal end of said derailleur cable therein;

an actuating member rotatably mounted around the one distal end of said handlebar and including an actuating disk rotatably mounted to the first side wall of said positioning disk, an actuating block formed on said actuating disk to rotate therewith and received in said depression and having an arcuate pushing perimeter slidably rested on said fixing stub of said derailleur cable, a substantially C-shaped retaining block formed on said actuating disk and received in said recess and including an open end portion facing said plurality of teeth and a closed end portion, a space defined in said retaining block and communicating with said open end portion; and a catch member fixedly attached to said retaining block to move therewith and including a flexible arcuate body slidably received in said recess; a lug formed on a first distal end of said arcuate body and securely retained in said space of said retaining block, a click formed on a second distal end of said arcuate body and detachably engaged with each of said plurality of teeth, said click being guided to slide over said guiding face of each of said plurality of teeth and a returning movement of said click being stopped by said stop face of associated said teeth.

2. The gear selector mechanism according to claim 1, wherein said stop face of each of said plurality of teeth has a slope greater than that of associated said guiding face.

3. The gear selector mechanism according to claim 1, wherein said positioning disk includes a first ear formed on a periphery thereof, a fastener member mounted for fastening said actuating disk to said positioning disk and including a second ear fixedly attached to said first ear and an arcuate pawl rested on said actuating disk, thereby fastening said actuating disk between said positioning disk and said fastener member.

4. The gear selector mechanism according to claim 1, wherein said positioning disk includes a flange formed on the second side wall thereof and having a chamber defined therein, a socket defined through a radially outer portion of said flange and communicating with said chamber, a positioning member received in said chamber and including an arcuate pawl rested against one distal end of said handlebar, an opening defined in a head portion of said positioning member and aligning with said socket, an adjusting block rested on said head portion of said positioning member and received in said chamber, an adjusting hole threadedly defined in said adjusting block and aligning with said socket and said opening, an urging bolt extending through said socket, said adjusting hole and said opening and urged on said head portion of said positioning member, thereby securing said positioning disk on the one distal end of said handlebar.

5. The gear selector mechanism according to claim 1, wherein an indicating post is formed on a periphery of said actuating disk, aligning with said click and located outward of said positioning disk.

6. The gear selector mechanism according to claim 1, wherein said arcuate pushing perimeter includes a first end portion located distal to a central portion of said actuating disk and a second end portion located proximate to the central portion of said actuating disk.

* * * * *